United States Patent
Ben-Ezra et al.

(10) Patent No.: US 11,816,543 B2
(45) Date of Patent: Nov. 14, 2023

(54) SYSTEM AND METHOD FOR USING KNOWLEDGE GATHERED BY A VEHICLE

(71) Applicant: OSR ENTERPRISES AG, Cham (CH)

(72) Inventors: Yosef Ben-Ezra, Petah Tikva (IL); Samuel Hazak, Holon (IL); Yaniv Ben-Haim, Kfar Mordechai (IL); Yoni Schiff, Yahud (IL); Shai Nissim, Tel Aviv (IL); Orit Shifman, Petach Tikva (IL)

(73) Assignee: OSR ENTERPRISES AG, Cham (CH)

( * ) Notice: Subject to any disclaimer, the term of this patent is extended or adjusted under 35 U.S.C. 154(b) by 149 days.

(21) Appl. No.: 16/766,692

(22) PCT Filed: Sep. 6, 2018

(86) PCT No.: PCT/IL2018/050999
§ 371 (c)(1),
(2) Date: May 24, 2020

(87) PCT Pub. No.: WO2019/049141
PCT Pub. Date: Mar. 14, 2019

(65) Prior Publication Data
US 2021/0374598 A1 Dec. 2, 2021

Related U.S. Application Data

(60) Provisional application No. 62/554,778, filed on Sep. 6, 2017.

(51) Int. Cl.
*G06N 20/00* (2019.01)
*G08G 1/01* (2006.01)
(Continued)

(52) U.S. Cl.
CPC .............. *G06N 20/00* (2019.01); *G06N 3/04* (2013.01); *G06N 3/08* (2013.01); *G06N 3/088* (2013.01); *G08G 1/0112* (2013.01)

(58) Field of Classification Search
CPC ............ G06N 20/00; G06N 3/04; G06N 3/08; G06N 3/088; G08G 1/0112
(Continued)

(56) References Cited

U.S. PATENT DOCUMENTS

| 9,073,555 B2 | 7/2015 | Otamez | |
| 2015/0199617 A1* | 7/2015 | Kuwajima | G06N 20/00 706/20 |
| 2017/0213457 A1* | 7/2017 | Sato | B60W 50/14 |

FOREIGN PATENT DOCUMENTS

JP 2017057528 4/2017

OTHER PUBLICATIONS

ISR and IPRP for PCT/IL2018/050999.

* cited by examiner

*Primary Examiner* — Tyler J Lee
*Assistant Examiner* — Tiffany P Ohman
(74) *Attorney, Agent, or Firm* — PEARL COHEN ZEDEK LATZER BARATZ LLP

(57) ABSTRACT

Methods, systems and computer program products for generating content for training a classifier, including: receiving two or more parts of a description, for each part, retrieving from an extracted feature collection library one or more extracted feature collections derived from one or more video frames, the extracted feature collections or the video frames labeled with a label associated with the part, thus obtaining a multiplicity of extracted feature collections, and combining the multiplicity of extracted feature collections to obtain a combined feature collection associated with the description, the combined feature collection to be used for training a classifier.

17 Claims, 3 Drawing Sheets

(51) Int. Cl.
*G06N 3/04* (2023.01)
*G06N 3/08* (2023.01)
*G06N 3/088* (2023.01)

(58) Field of Classification Search
USPC .......................................................... 706/25
See application file for complete search history.

SYSTEM AND METHOD FOR USING KNOWLEDGE GATHERED BY A VEHICLE

CROSS-REFERENCE TO RELATED APPLICATIONS

This application is a National Phase Application of PCT International Application No. PCT/IL2018/050999, International Filing Date May 9, 2018, claiming priority of U.S. Patent Application(s) No. 62/554,778, filed May 9, 2017, which are hereby incorporated by reference.

TECHNICAL FIELD

The present disclosure relates to autonomous vehicles in general, and to a system and methods for using knowledge gathered by one or more vehicles in particular.

BACKGROUND

As autonomous vehicles become a clear vision and millions of which starting spreading over the globe, it is required to overcome some limitations and improve their performance.

Autonomous vehicles can operate at various degrees of autonomy. A common autonomy scale is 0-5, wherein level 0 indicates no automation at all, level 1 is driver assistance, level 2 is partial automation, level 3 is conditional automation, level 4 is high automation, and level 5 is complete automation. The autonomy degree may change in accordance with the situation of the vehicle, including parameters such as location, driving conditions, road conditions, or the like. For example, in a well-known environment or in conformable driving conditions a vehicle may exercise a higher degree of autonomy than in a new area or under harsher driving conditions.

Thus, in order to enjoy the option of higher autonomy degree in a variety of locations and situations, a vehicle needs to be trained in these locations and situations. However, an autonomous vehicle comes with predetermined training, suitable for one or more locations and/or default behaviors. In order to improve the behavior of such vehicles and identify relevant elements and situations in further locations and situations, large training corpuses of sensory data and analysis thereof are required, for training the relevant artificial intelligence tools used by the vehicle. The collection, analysis, training and application of such data may require significant time and effort of capturing the information, analyzing, training engines and applying the trained engine.

BRIEF SUMMARY

One exemplary embodiment of the disclosed subject matter is a computer-implemented method for using knowledge gathered by a vehicle, the method comprising: receiving information from a first vehicle by a second vehicle, the information related to a context the first vehicle has experienced and relevant to the second vehicle; storing the information on the second vehicle; training a network of networks by a processor associated with the second vehicle, the network of networks including the information and additional information previously available to the second vehicle. Within the method, training the network of networks optionally comprises creating an additional layer activating a first network based on the information and a second network based on the additional information. Within the method, training the network of networks optionally comprises transfer learning for creating a unified network the information and the additional information. The method can further comprise: determining whether a performance of the network of networks exceeds the performance of a network based only upon the additional information; and subject to the performance degrading, retrieving a network of the second vehicle based only on the additional information. Within the method, said receiving or said transmitting is optionally performed wirelessly. The method can further comprise preprocessing and analyzing the information by the processor associated with the second vehicle. The method can further comprise: notifying by the first vehicle a controller about availability of the information; receiving from the controller details of the second vehicle; and establishing communication with the second vehicle.

Another exemplary embodiment of the disclosed subject matter is a computer-implemented method for using knowledge gathered by a vehicle, the method comprising: receiving information from a first vehicle by a server, the information related to a context the first vehicle has experienced; storing the information on a storage device associated with the sever; determining a second vehicle to which the context is relevant; training a network of networks by a processor associated with the server, the network of networks including the information and additional information previously available to the second vehicle; and transmitting the information to the second vehicle. Within the method, training the network of networks optionally comprises creating an additional layer activating a first network based on the information and a second network based on the additional information. Within the method, training the network of networks optionally comprises training the information and the additional information into a unified network. The method can further comprise: determining whether a performance of the network of networks improving the performance of a network based only upon the additional information, wherein transmitting the information to the second vehicle is subject to the performance improving performance of a network based only upon the additional information. Within the method, said receiving or said transmitting is optionally performed wirelessly. The method can further comprise preprocessing and analyzing the information by the processor associated with the server.

Another exemplary embodiment of the disclosed subject matter is a computerized apparatus having a processor, the processor being adapted to perform the steps of: receiving information from a first vehicle by a second vehicle, the information related to a context the first vehicle has experienced and relevant to the second vehicle; storing the information on the second vehicle; training a network of networks by a processor associated with the second vehicle, the network of networks including the information and additional information previously available to the second vehicle; and transmitting the information to the second vehicle.

Yet another exemplary embodiment of the disclosed subject matter is a computer program product comprising a computer readable storage medium retaining program instructions, which program instructions when read by a processor, cause the processor to perform a method comprising: receiving information from a first vehicle by a server, the information related to a context the first vehicle has experienced; storing the information on a storage device associated with the sever; determining a second vehicle to which the context is relevant; training a network of networks by a processor associated with the server, the network of networks including the information and additional information previously available to the second vehicle; and transmitting the information to the second vehicle.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
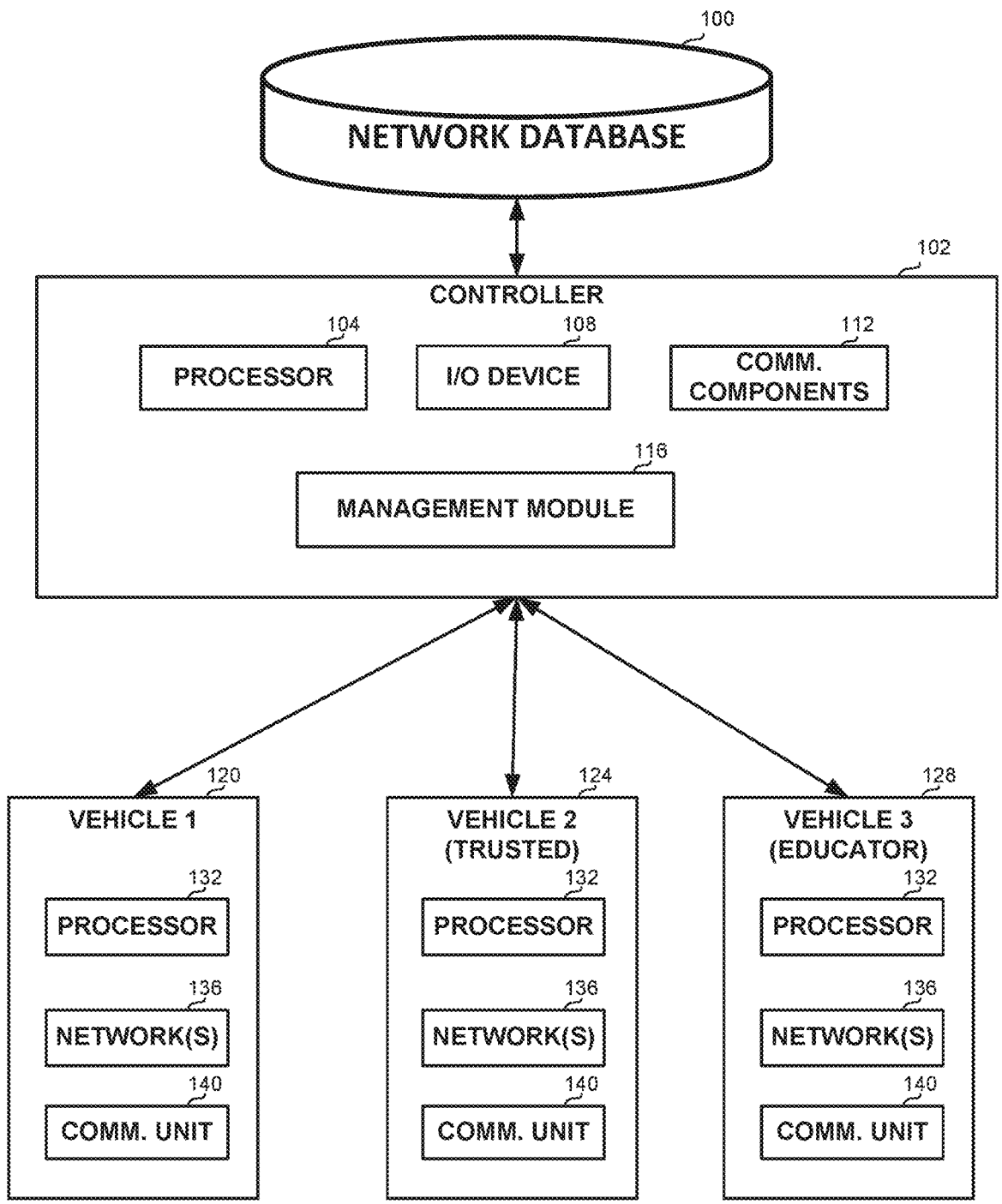
FIG. 1 is a schematic block diagram of a system for using knowledge gathered by a vehicle, in accordance with some embodiments of the disclosure.

One technical problem dealt with by the disclosed subject matter is that all vehicles by the same manufacturer, or at least the vehicles intended to be sold in a particular country or area come equipped with the same artificial intelligence (AI) systems, trained in the same manner over the same corpus. In some advanced situations, the vehicles may be trained in accordance with their intended use, and particularly the destination where they are supposed to be sold to a user.

The vehicles are then spread over the globe or over a more limited area, and each is operated in a different environment, different weather, with different passengers and driving requirements, or the like. Each such vehicle may be trained over time with sensor data and behaviors it captured and the vehicle and driver behavior, but that information is not shared with other vehicles, although such sharing can be highly useful. For example, a vehicle moving from California to Colorado can benefit from experience gathered by Colorado vehicles, without having to collect and process the data to obtain this experience on its own. In another example, a vehicle used in northern Europe in the winter may experience driving conditions that can be experienced in the southern hemisphere six months later. However, such sharing is currently not enabled and precious experience is not utilized.

Another technical problem dealt with by the disclosed subject matter is that learning new experiences and conditions is rather slow, since only information received from trustees or educators, i.e., people associated with or otherwise certified by the company is used for training the systems. Furthers, only when an autonomous car arrives at a care center it is updated with the new information. Thus, gathered experience is utilized slowly and vehicles do not benefit as much as possible.

One technical solution provided by the disclosed subject matter relates to creating a "network of networks", such that vehicles can learn and benefit from the experience gathered by other vehicles. For example, the AI tools used by a vehicle moving from California to Colorado, which may comprise a trained network, may be enriched with a second network, received from one or more vehicles trained in Colorado, and can thus have the accumulated knowledge of how to behave in the new topographic area and with the driving conditions common in Colorado.

Thus, information from a multiplicity of vehicles may be collected over a network of the cars, and used for further training of AI engines of other cars, thus utilizing crowd wisdom. Although some of the gathered information may be incorrect, the majority thereof may still be trusted to be useful and valuable, and thus make a positive contribution to the engines. The information may be provided by the drivers or owners of the autonomous cars subject to their agreement, and optionally subject to compensation. The compensation may include reduction in insurance premium. For example, any driver can agree to collection of certain types of information, such as sensor data, camera capture outside the car, camera capture inside the car, engine or other car systems data, user parameters, or the like.

A network, for example a neural network used by an AI engine in a vehicle, may be represented as an 'h' in the equation of $X*h=Y$, wherein X comprises data collected by sensors, for example image data, radar data, Lidar data, behavior data of the vehicle, or the like; h is a set of weights or other parameters applied to the data; and Y is a decision, also referred to as an identified object, a correct behavior, classified information, a region of interest (ROI) within an image, or the like. During training, X and Y are given as X is captured and Y is the taken behavior, and h is learned. Then, when the network is used, h is applied to a given input X, to obtain Y.

It will be appreciated that the 'h' may be learned from filtered events, provided by trusted sources, such as vehicles driven by trusted drivers, "educator" vehicles associated with the manufacturer of the car or of systems therein, or the like. Thus, the received data is known to be trustable and reliable, and can therefore be used.

Thus, augmenting the existing network used by a vehicle with another network for example gathered in new situations, may be equivalent to adding further h's to be applied to X inputs occurring in the new situations, and "teaching" the vehicle how to cope with situations which it had not experienced before. Absent this teaching, the vehicle systems may assume a lower level of autonomy, make mistakes, or the like.

In some embodiments, augmenting networks to create a network of networks may use generative adversary networks (GANs), in which each network learns from the other and optionally competes with the other over success rate, in order to improve both networks and provide collective knowledge extraction.

The network augmenting may be performed automatically. For example, when it is recognized that the vehicle has travelled to a new area, is experiencing new conditions, or the like. Further information may be obtained, for example when the vehicle arrives at a new area, and contacts a server that provides information about the conditions at the location. For example, the server may notify that the current area is rather snowy, thus Lidar information is less reliable; that the roads contain significant quantities of metal therefore radars are less reliable; that road signs are different, or the like. The server may then provide the vehicle with information relevant to the area or conditions, and the vehicle systems may be updated instantaneously.

In alternative embodiments, a vehicle may be updated with new or updated networks from other vehicles in a peer-to-peer method. This provides for immediate application and usage of new data. In addition, the data may be collected rather fast as not only trustees are collecting it but a much larger volume of vehicles.

In some embodiments, when one or more networks are not required for the vehicle anymore, for example the vehicle from California that travelled to Colorado is going back to California, the additional network may be removed, for example by removing extra layers or by retrieving a backup of a previously stored system.

Thus, a vehicle may receive an additional network from a management module having access to a database of networks. Alternatively or additionally, a vehicle can receive such network from another trusted vehicle. In further embodiments, the vehicle can receive the network from another vehicle, but subject to approval from the management module, which may verify that the information is received from a trusted source, makes the performance better, or the like.

Another technical solution of the disclosed subject matter relates to maintaining a database of networks, wherein each network relates to driving conditions combination, sensor combination, a location, or a combination of two or more of the above. A vehicle can have a network adapted to the conditions it is used with. Whenever the situation changes, or at some predetermined time intervals, the vehicle network may be expanded by another network adapted to the current conditions of the vehicle, thus providing the vehicle with advanced capabilities.

One technical effect of the disclosure provides for fast, efficient and reliable expansion of the autonomous capabilities of vehicles, in particular when their usage situation changes, by using knowledge gathered by other vehicles. The effect is enabled by creating a "network of networks" and in particular neural networks to be used the vehicle to achieve this goal. This effect can be achieved without losing existing capabilities or knowledge of the vehicle, such that it can still function just as well when previous conditions are resumed. The network or networks thus integrates the common experience and artificial intelligence systems of individual vehicles, and applies insights obtained by one vehicle to one or more other vehicles, thus sharing the knowledge, enriching and updating their AI, and improving the performance of individual vehicles.

Another technical effect relates to maintaining a database of networks, suitable for a plurality of areas, situations, driving conditions or the like, which can be used at a short notice for augmenting the network used by a particular vehicle.

Referring now to FIG. 1 showing a block diagram of a system in accordance with some exemplary embodiments of the disclosed subject matter.

The environment may comprise a network database 100 comprising a multiplicity of networks gathered from various vehicles. Thus, each network may be received from a vehicle, and may comprise driving or other analysis information relevant to one or more areas, under one or more driving condition combinations, referring to one or more sensors or sensor types used, additional parameters, or combinations of any one or more of the above. It will be appreciated that network database 100 can store information formats other than networks, for example raw information, rule based information, or the like. In some embodiments, such information can be used for training networks. The networks may be indexed in database 100 in accordance with the context they were trained upon, for example vehicle (s) the information was received from, geographic location, driving conditions, terrain type, sensors form which the data used for training was collected and their relative efficiency, decisions taken by a human or by an autonomous vehicle, or the like.

The system may comprise controller 102, which may be configured to communicate with network database 100 and with one or more vehicles, such as vehicle 1 (120), trusted vehicle 2 (124) or educator vehicle 3 (128).

In some exemplary embodiments, controller 102 can comprise one or more communication components 112 for communicating with database 100 and one or more vehicles, such as vehicles 120, 124 or 128. Controller 102 can use communication components 112 to receive information such as network from one or more vehicles, and transmit one or more networks to vehicles. The received networks may be verified for their authenticity, quality, or other parameters.

Controller 102 can be implemented as a server, a cloud device, or the like. Controller 102 may comprise a processor 104, which may be a Central Processing Unit (CPU), a microprocessor, an electronic circuit, an Integrated Circuit (IC) or the like. Processor 104 may be utilized to perform computations required by controller 102 or any of it subcomponents. Processor 104 may be configured to execute computer-programs useful in performing the methods of FIGS. 2A, 2B and 3 below.

In some exemplary embodiments, controller 102 may comprise one or more I/O devices 108 which may be configured to receive input from and provide output and/or visualization to a user. In some exemplary embodiments, I/O devices 108 may be utilized to visually present to user a model data related to one or more networks, vehicles, drivers or owners of the vehicles, geographic areas, weather relates=d information, or the like. 110 devices 108 may also be utilized to obtain user input instructions useful in creating a network, combining networks, or the like.

Vehicle 120 can be any vehicle, for example driven by a customer. Vehicle 124 can be a trusted vehicle, for example a vehicle driven by a driver known to be a careful driver, providing reliable reports, or the like. Vehicle 128 can be an educator vehicle, for example a vehicle associated with an organization implementing the system, a car manufacturer, a knowledge base manufacturer, or the like.

Communication with database 100 may be wired or wireless, and communication with the vehicles is typically wireless, although in some situations for example when a vehicle is at a repair shop, the communication may be wired, too.

Each vehicle can comprise a processor 132, for example a dedicated processor configured for analyzing information received from one or more sensors, applying a network and making a decision related to autonomous driving at any level. Processor 132 may also be a CPU, a microprocessor, an electronic circuit, an IC, or the like. In some embodiments processor 132 may not be a dedicated processor but may rather serve also other purposes, such as display, fuel consumption calculations, or the like. Processor 132 may implement AI techniques for automatic recognition of objects or situations, and decision making. The processing may include deep learning, thus any one or more networks may be a deep neural network.

Each vehicle can also comprise one or more networks 136, which may be stored in a memory device of the vehicle. Each network may be received from an external source such as controller 102 or another vehicle, trained by the vehicle, or the like. Network 136 may be used by or integrated into processor 132 for making autonomy-related decisions. In accordance with some embodiments, network 136 may be combined from one or more initially received or trained networks, and one or more networks received from other vehicles in accordance with the disclosure. Further networks may be network layers connecting two or more other networks.

Each vehicle can also comprise one or more communication components 140, for communicating with controller 102 and in particular with communication component 112 thereof, for transmitting or receiving information such as networks. One or more communication components 140 may also be used for communicating with other vehicles for directly receiving or transmitting networks. It will be appreciated that communication components 140 can operate in any of a variety of protocols and over a variety of channels, such as but not limited to BLE, Wi-Fi, 3G, 4G, 5G, V2I, V2X, or the like.

Figure 2A:
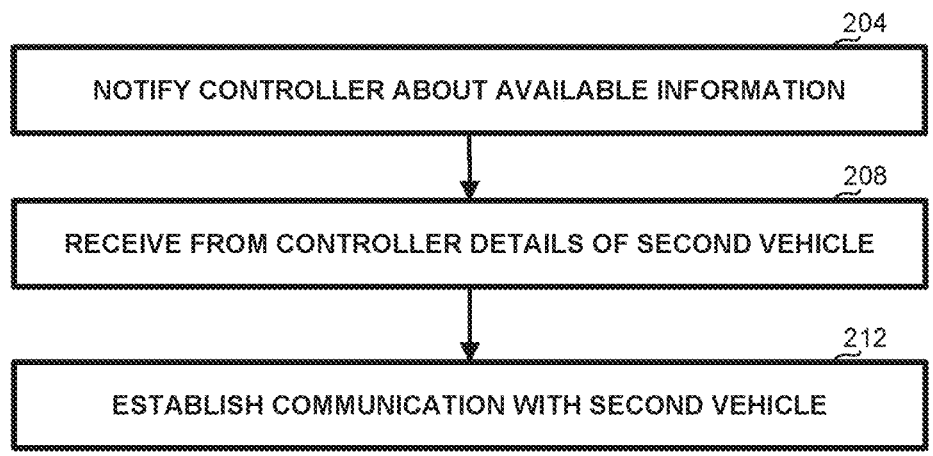
FIG. 2A is a flowchart of a method of establishing communication between relevant vehicles, in accordance with some embodiments of the disclosure.
Figure 2B:
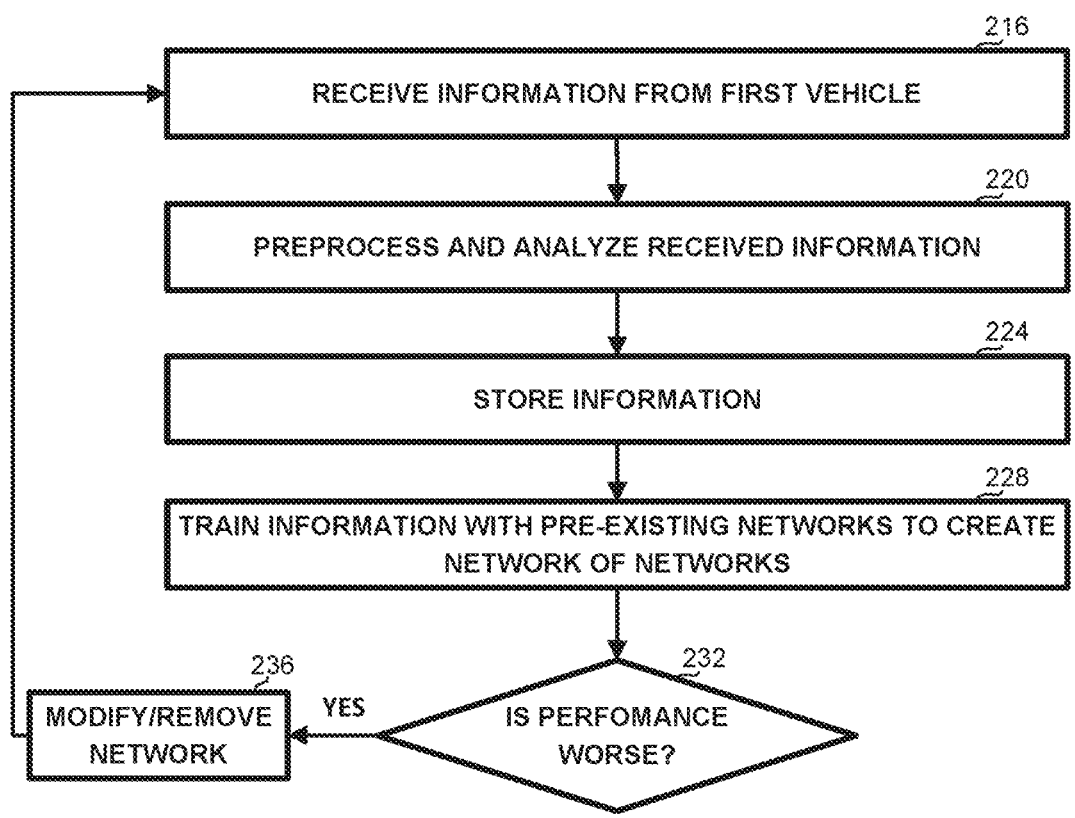
FIG. 2B is a flowchart of a first embodiment of a method of using knowledge gathered by a vehicle, in accordance with some embodiments of the disclosure.

Referring now to FIGS. 2A and 2B, showing a flowchart of a first embodiment of a method of establishing communication and using knowledge gathered by a vehicle, in accordance with some embodiments of the disclosure. The method may be applied in peer-to-peer mode, in which knowledge is transferred directly from one vehicle to another.

Referring now to FIG. 2A, showing a flowchart of a method for establishing communication between relevant vehicles, in accordance with some embodiments of the disclosure. On step 204, controller 102 may be notified by a first vehicle about information available to be shared with other vehicles. The information may relate to a certain context, for example a geographic area, certain driving conditions, or the like. In some embodiments the notification can be made upon a query by controller 102 or another platform, after at least a predetermined period of driving time in the context, at least a predetermined volume data has been collected, at least a predetermined number or types of situations have been detected, upon a decision of a human driver or operator, or the like. The first vehicle may be any vehicle driven by any driver, such as vehicle 120, a trusted vehicle 124, or an educator vehicle 128.

On step 208, the first vehicle may receive from controller 102 through communication components 112 and 140, the details of one or more second vehicles to which the context may be relevant, for example vehicles experiencing or about to experience the context. The details may include internet protocol (IP) address VANET code, IMEI code, OAuth, or other details enabling communication with the second vehicle.

On step 212, the first vehicle may establish communication with the second vehicle. The first vehicle can communicate with one second vehicle at a time, or with multiple second vehicles in parallel.

Referring now to FIG. 2B, showing a flowchart of a method of using knowledge gathered by a vehicle, in accordance with some embodiments of the disclosure.

After communication is established on step 212, processor 132 of the second vehicle may receive (216) information from the first vehicle. The information may be in any format, including but not limited to a trained network which may comprise a collection of weights, inputs and outputs, for example: an image and an object recognized within the image; a situation and behavior; or the like.

Processor 132 may preprocess and analyze (220) the received information, if required. The preprocessing and analysis may include but are not limited to any one or more operations such as image manipulation, sensor fusion adjustment, resizing, color correction or data normalization.

The information can be stored (224) with networks 136 of the second vehicle. The network may be stored with corresponding indexing, for example details of the first vehicle, or any relevant details, such as geographic location, driving conditions or others, such as details upon which the network may have trained.

On step 228 a network can be trained upon the information (unless the information included trained network(s)) with networks pre-existing on the second vehicle, to create a network of networks. The network of networks may be trained by processor 132 of the second vehicle with the pre-existing network(s) by creating an additional layer, implemented for example as another network, which may classify situations or input to be handled by the pre-existing network or the new network. In some embodiments, transfer learning may be performed in which the existing network is enhanced and enriched by the new network, to form a unified network. As detailed below, in order to remove the new network from the unified network, a backup of the pre-existing network has to be stored prior to the transfer learning. It will be appreciated that storing (224) the information may be performed after the training, wherein the created network may be stored.

On step 232, processor 132 may determine whether the performance of the network of networks is worse than the performance of the pre-existing networks. The performance may be compared to the performance of the pre-existing network. Determining may be performed by executing a test bench, testing on a training set, or the like.

If the performance degraded, then on step 236 the newly received or trained network may be modified or removed from the network of networks. The removal can be performed by removing the additional layer if one was created, or by retrieving a previous version of the network from a backup. If the performance has not changed, the network may be removed or not, depending for example on configuration parameters. In some embodiments, it may be determined whether the performance can be improved, for example by obtaining additional data, applying a different training method or training parameters, or the like. In some embodiments, a human user may be presented with the details of the new and existing networks and the user may decide whether and which changes may be attempted for improving the performance.

The process may continue with collecting further data and repeating the steps above for further improving the behavior of one or more vehicles or providing knowledge related to further locations or situations.

Figure 3:
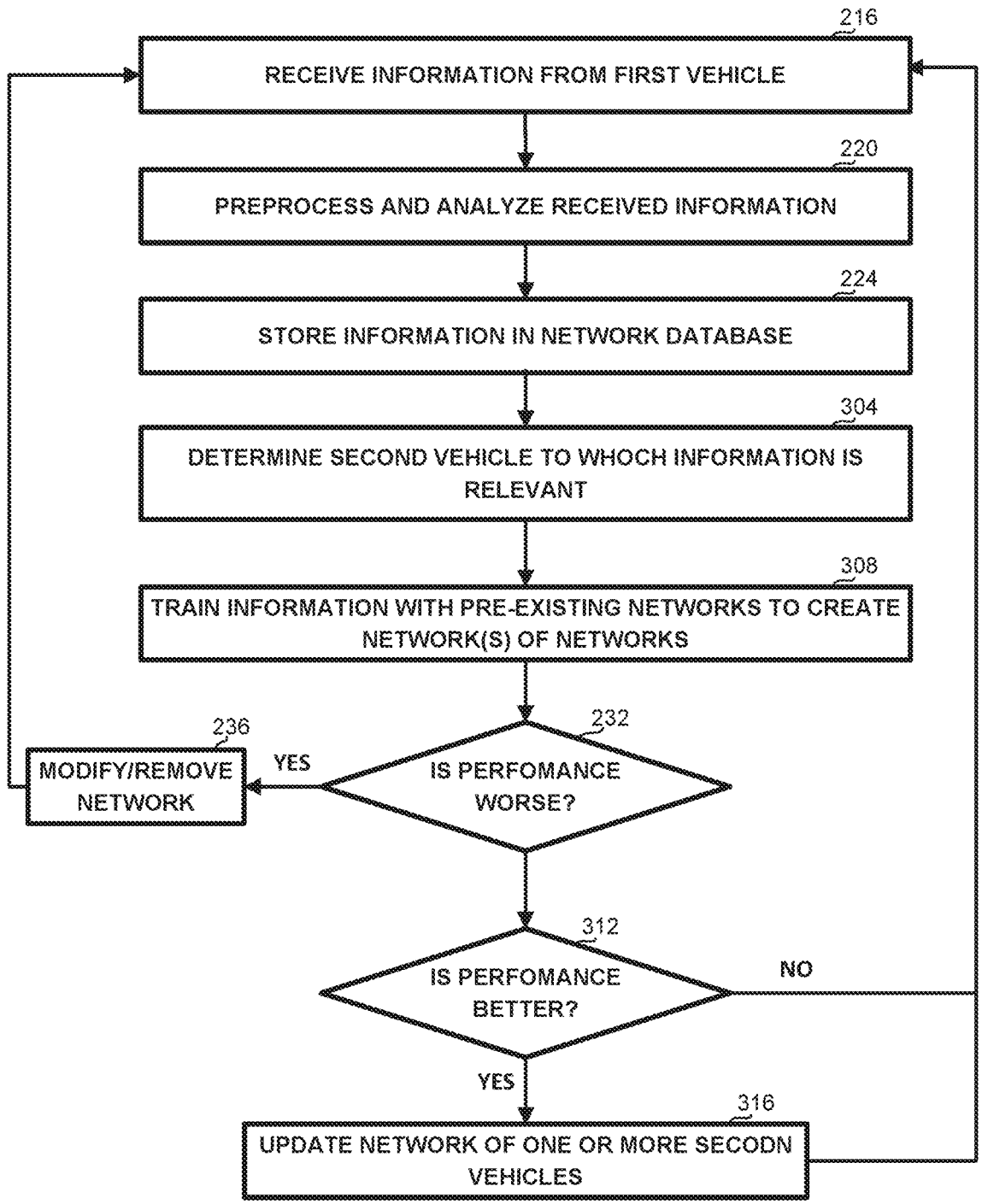
FIG. 3 is a flowchart of a second embodiment of a method of using knowledge gathered by a vehicle, in accordance with some embodiments of the disclosure.

Referring now to FIG. 3, showing a flowchart of a second embodiment of a method of using knowledge gathered by a vehicle, in accordance with some embodiments of the disclosure.

Processor 104 of controller 102 may receive (216) information from a first vehicle. The information may be in the form of a network, comprising a collection of inputs and outputs, for example: an image and an object recognized within the image; a situation and behavior; or the like. Alternatively, the information may be received in another manner which may require training. The information may be received upon request by controller 102, upon a vehicle transmitting the network due to a condition being met, for example at least a predetermined volume of training has been completed by the vehicle, the vehicle having spent at least a predetermined time in an area or under certain conditions, or the like.

Processor 104 may preprocess and analyze (220) as described in association with FIG. 2B above.

Processor 104 may store (224) the network in network database 100. The network may be stored with corresponding indexing, for example details of the first vehicle and any relevant details, such as geographic location, driving conditions or others upon which the network has been trained.

On step 304, processor 132 can determine one or more second vehicles to which the information may be relevant. The information may be obtained from an external source such as a vehicle management module, which may be associated with an organization, with a vehicle manufacturer, or the like, from information such as Global Positioning System (GPS) received from vehicles which are determined to be in relevant areas, from driver reports or requests, or the like.

On step 308, processor 104 can train one or more networks of networks, each comprised of the newly received information and one or more existing networks available to or associated with one or more of the vehicles determined on step 304. Training may include adding an additional layer with one or more networks available to one or more of the second vehicles, implemented for example as a further network, which may classify situations or input according to which network should handle them: the pre-existing network or the new network. In some embodiments, transfer learning may be performed in which a network of the second vehicle is enhanced by the new network, to form a unified network. As detailed below, in order to remove the new network from the unified network, a backup of the pre-existing networks may be stored prior to the transfer learning and then retrieved.

On step 232, processor 104 may determine whether the performance of the network of networks is worse than the performance of any of the separate networks. The performance may be compared to the performances of any of the pre-existing networks and to the performance of the network. Determining may be performed by executing a test bench, testing on a training set, or the like.

If the performance degraded, then on step 236 the newly received network may be modified or removed from the combined networks. The removal can be performed by removing the additional network layer, or by retrieving a previous network from a backup if a unified network was created. As detailed above, it may be determined whether the performance can be improved, and a human user may decide whether and which changes may be attempted for improving the performance.

On step 312, processor 104 may determine whether the performance of one or more of the combined network is better than the performance of the pre-existing networks. The performance may be compared to the performances of any of the pre-existing networks and to the performance of the received network. Determining may be performed by executing a test bench, testing on a training set, or the like. It will be appreciated that steps 232 and 312 can be performed together.

If the performance is better, then on step 316 one or more of the newly generated networks of networks may be provided to one or more of the second vehicles determined on step 304, such that each second vehicle is updated with a network of networks comprising the information it already has, and network relevant to the context it is experiencing or about to experience.

In some embodiments, training the network of networks may not be performed by processor 104. Rather, the information may be provided to the second vehicle and processor 132 of the second vehicle may perform the training in either of the methods described above, such as creating an additional layer or transfer learning. Training may be performed when the vehicle is in idle state and has available computing resources.

The process may repeat for further improving the behavior of one or more vehicles.

It will be appreciated that the disclosed system and methods are not limited to updating vehicles with data of new areas or conditions. Rather, more updated networks related to areas or situations experienced by the vehicle may be provided, for improving the vehicle responses.

In accordance with the disclosed system and methods two or more vehicles connected wirelessly in a network may thus enjoy new engines covering more or updated situations and conditions, as provided by information collected by other drivers and vehicles. This provides for immediate application and usage of new or improved data. In addition, the data is collected rather fast as not only trustees are collecting it but a much larger volume of vehicles.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, Java, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for using knowledge gathered by vehicles, the method comprising:
   receiving information from a first vehicle by a second vehicle, the received information related to a context for an environment the first vehicle has experienced, and the received information being also relevant to an environment of the second vehicle;
   storing the received information on the second vehicle;
   training a network of neural networks by a processor associated with the second vehicle, the network of networks comprising the received information and additional information previously available to the second vehicle,
   wherein the network of neural networks is created by augmenting networks using generative adversary networks.

2. The method of claim 1, wherein training the network of networks comprises creating an additional layer activating a first network based on the received information and a second network based on the additional information, and wherein the additional layer is implemented as a new neural network.

3. The method of claim 1, wherein training the network of networks comprises transfer learning for creating a unified network the received information and the additional information.

4. The method of claim 1, further comprising:
  determining whether a performance of the network of networks exceeds the performance of a network based only upon the additional information; and
  subject to the performance degrading, retrieving a network of the second vehicle based only on the additional information.

5. The method of claim 1, wherein said receiving or said transmitting is performed wirelessly.

6. The method of claim 1, further comprising preprocessing and analyzing the received information by the processor associated with the second vehicle.

7. The method of claim 1, further comprising:
  notifying by the first vehicle a controller about availability of the received information;
  receiving from the controller details of the second vehicle; and
  establishing communication with the second vehicle.

8. The method of claim 1, wherein the context if further associated with at least one of: an operation performed by the first vehicle, and sensors form which the information used for training is collected.

9. A method for using knowledge gathered by vehicles, the method comprising:
  receiving information from a first vehicle by a server, the received information related to a context for an environment the first vehicle has experienced;
  storing the received information on the server;
  determining a second vehicle that experiences an environment to which the context is relevant;
  training a network of neural networks by a processor associated with the server, the network of networks comprising the received information and additional information previously available to the second vehicle; and
  transmitting the received information to the second vehicle,
  wherein the network of neural networks is created by augmenting networks using generative adversary networks.

10. The method of claim 9, wherein training the network of networks comprises creating an additional layer activating a first network based on the received information and a second network based on the additional information, and wherein the additional layer is implemented as a new neural network.

11. The method of claim 9, wherein training the network of networks comprises training the received information and the additional information into a unified network.

12. The method of claim 9, further comprising:
  determining whether a performance of the network of networks improving the performance of a network based only upon the additional information,
  wherein transmitting the received information to the second vehicle is subject to the performance improving performance of a network based only upon the additional information.

13. The method of claim 9, wherein said receiving or said transmitting is performed wirelessly.

14. The method of claim 9, further comprising preprocessing and analyzing the received information by the processor associated with the server.

15. The method of claim 9, wherein the context if further associated with at least one of: an operation performed by the first vehicle, and sensors form which the information used for training is collected.

16. A computer program product comprising a computer readable storage medium retaining program instructions, which program instructions when read by a processor, cause the processor to perform a method comprising:
  receiving information from a first vehicle by a server, the received information related to a context for an environment the first vehicle has experienced;
  storing the received information on the server;
  determining a second vehicle that experiences an environment to which the context is relevant;
  training a network of neural networks by a processor associated with the server, the network of networks comprising the received information and additional information previously available to the second vehicle; and
  transmitting the received information to the second vehicle,
  wherein the network of neural networks is created by augmenting networks using generative adversary networks.

17. The computer program product of claim 16, wherein the context if further associated with at least one of: an operation performed by the first vehicle, and sensors from which the information used for training is collected.

* * * * *